J. HOFMANN.
PNEUMATIC SPRING.
APPLICATION FILED APR. 13, 1914.
1,151,591.
Patented Aug. 31, 1915.
2 SHEETS—SHEET 1.
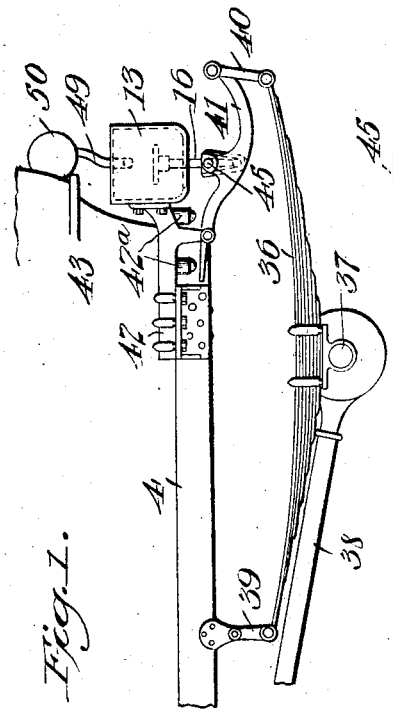
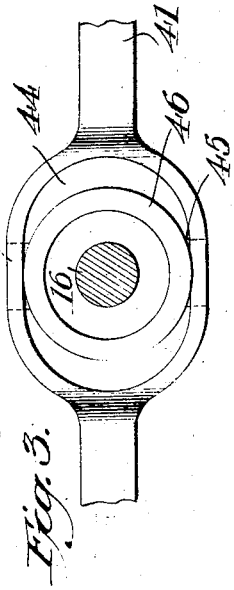
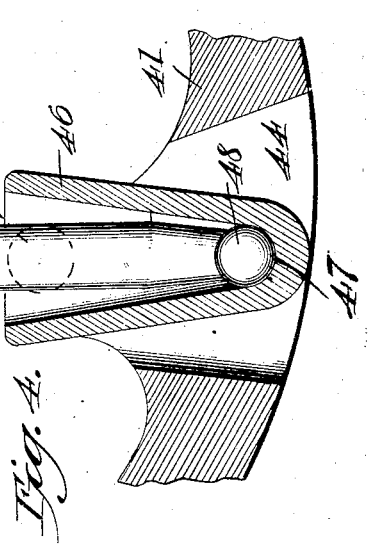
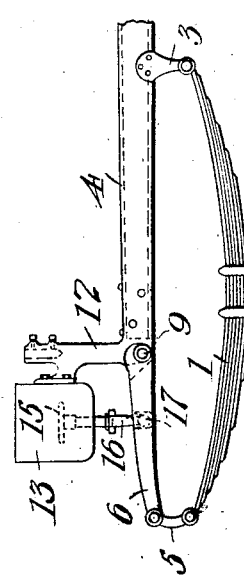
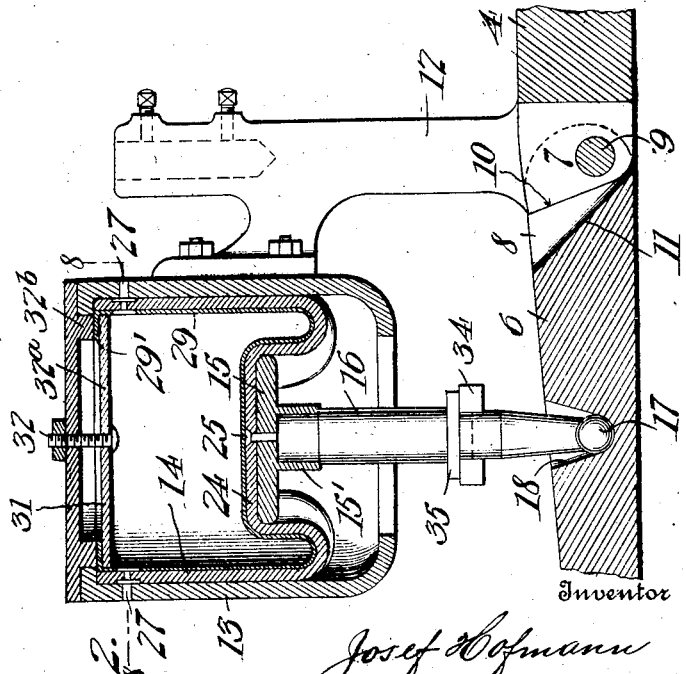
Witnesses
Inventor
Josef Hofmann
By
Attorney J. HOFMANN.
PNEUMATIC SPRING.
APPLICATION FILED APR. 13, 1914.
1,151,591.
Patented Aug. 31, 1915.
2 SHEETS—SHEET 2.
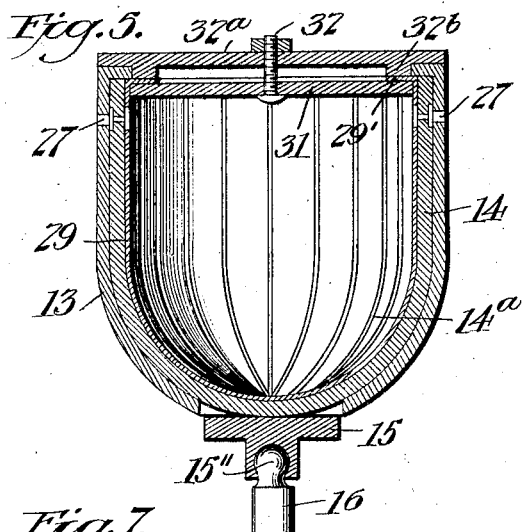
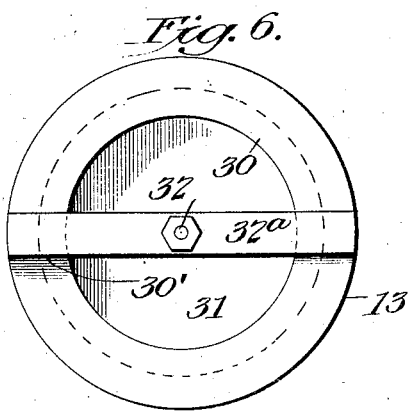
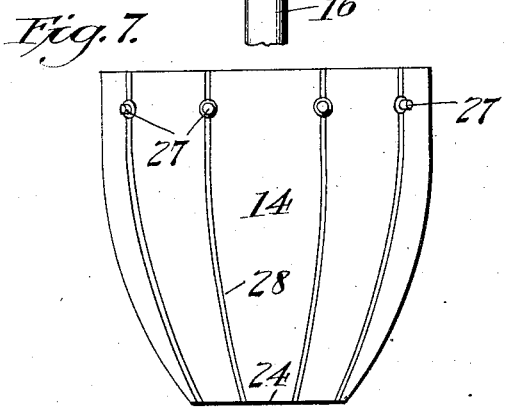
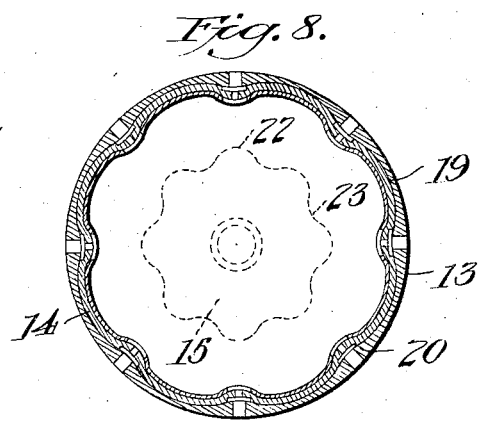
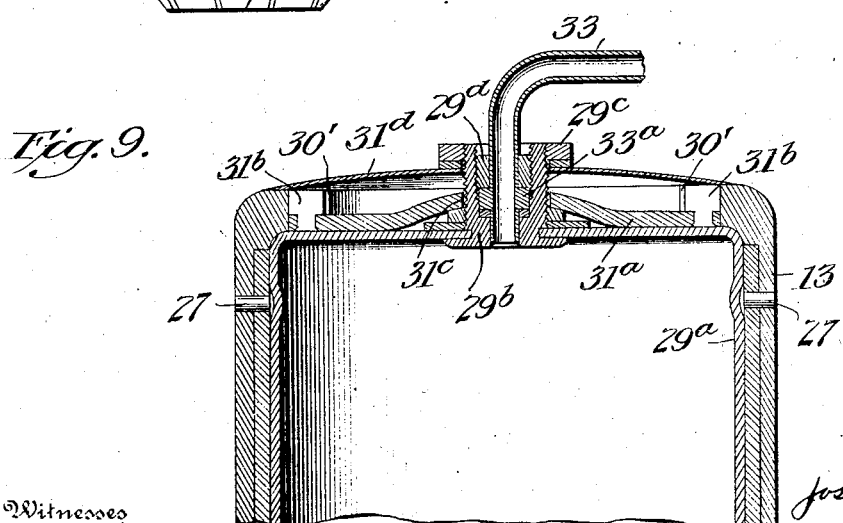

UNITED STATES PATENT OFFICE.

JOSEF HOFMANN, OF MONT PELERIN, SWITZERLAND.

PNEUMATIC SPRING.

1,151,591.  Specification of Letters Patent.  Patented Aug. 31, 1915.

Application filed April 13, 1914. Serial No. 831,494.

*To all whom it may concern:*

Be it known that I, JOSEF HOFMANN, a citizen of the Republic of Switzerland, residing at Mont Pelerin, Switzerland, have invented certain new and useful Improvements in Pneumatic Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to pneumatic springs or shock absorbers for vehicles and is of the well known type in which a flexible diaphragm is secured within a rigid casing, mounted in fixed relation to the vehicle body, and coöperating with a plunger which is connected with the running gear of the vehicle.

In known existing springs of this type, the plungers are provided with stems or bodies which are slidably mounted in stationary guide members, and any displacement between the vehicle body and the running gear will cause a lateral displacement or twisting between the sliding elements of the spring, which will result in a binding of said elements. This binding not only prevents a satisfactory operation of the spring, but speedily results in a wearing out of the parts thereof.

The object of this invention is to overcome these defects and to provide a pneumatic spring designed especially for use on automobiles of the standard types, but whose features of construction are susceptible of embodiment in other forms of vehicles; and to this end my invention consists in the cylinder, diaphragm, plunger and support for the latter having the construction and arrangement substantially as hereinafter set forth.

In making my invention, my aim has been to solve the problem of the binding of the elements, and this I have accomplished by providing a structure wherein all sliding contact between the parts of the pneumatic spring and all sliding motion between the steel springs and the above mentioned spring are eliminated. The elimination is effected by connecting the ends of the steel springs to the plunger supporting levers in such a manner that there is no sliding motion between these connections and consequently there is no sliding contact, due to lateral thrusts of the running gear and car frame nor between the plunger and cylinder as in the known constructions where the pneumatic spring is connected to the ends of the steel springs.

While in the present device the plungers may be supported directly on the vehicle axle, I have provided means for connecting the plungers with the vehicle springs in a way as to secure a perfect guide for the plunger, as well as for the steel springs, it being important in curves and other side thrusts to further permit large amplitude of the air spring, and still avoid entirely sliding motion and binding of elements as before mentioned, a function which as I believe has not been accomplished by any of the known forms of suspension and which is of greatest importance to the free play and flexibility of such a spring and its durability. I also reduce by this arrangement the movement of the plungers and therefore of the diaphragms to their half value or even more, and by this I increase the life of such diaphragms, which is of great importance and a technical improvement on similar devices.

The construction of cylinder, form of plunger, structure of diaphragm, the operation of the latter when the plunger works up and down in the cylinder, also the method of attaching the pneumatic spring to the running gear of the vehicle, I believe to be novel.

The plunger is guided centrally solely by the compressed air itself without any mechanical means. The reason for this novel function lies in the tendency of compressed air (or other gas) to press equally on any material or substance exposed to it and therefore seek a balance in its mechanical equivalent. The power in my case, the compressed air, acts upon a diaphragm, the center of which is mounted on a plunger.

If the plunger is once set centrically, the air will not permit the plunger head to get out of the center, and if brought out of center, which requires a very great force, the plunger will immediately spring back to its normal center position. By this arrangement a perfectly safe guiding of the plunger head is provided and all sliding contact is eliminated.

To provide for the gathering of the fabric, of which the diaphragm is composed, when it gradually assumes the diameter of the plunger head (this being considerably smaller than the diameter of the cylinder) while the plunger is moving toward the cylinder head, I so construct the diaphragm, cylinder and plunger, that the gathering of the fabric of the diaphragm is effected by the compressed air itself which forms the diaphragm into a plurality of grooves or channels and by so doing reduces the diameter of the diaphragm, which is necessary to permit the latter to enter the cylinder, the walls of which it has shortly before been touching.

My improvements are capable of application to various forms of steel spring structures, but it will be sufficient to illustrate the invention to show the same in connection with the well known half and three quarter elliptic steel spring which is the most common form in use on automobiles.

In the accompanying drawings,—Figure 1 is a side view of the front and rear portions of an automobile frame having my improvements applied thereto. Fig. 2 is an enlarged detail vertical section of the front portion of Fig. 1. Fig. 3 is an enlarged detail plan view of the supporting lever shown in the rear portion of Fig. 1. Fig. 4 is a sectional view of Fig. 3. Fig. 5 is a vertical section of the preferred form of diaphragm and cylinder. Fig. 6 is a top view of the compressed air cylinder. Fig. 7 is a side view of a modified form of diaphragm. Fig. 8 is a horizontal section on line 8—8 of Fig. 2. Fig. 9 is a detail sectional view of a modified form of cylinder head and securing means therefor.

As shown in Fig. 1 the front and rear springs are semi-elliptic; each front spring 1 is rigidly connected, in the usual manner, to the front axle 2, the rear end being pivotally connected to a bracket 3, which is rigidly connected to the side of the automobile frame 4.

The front end of the spring 1 is connected by a shackle 5 to the front end of a yielding plunger support which preferably consists of a rigid lever 6 hinged at its rear end to the front of the frame 4. This provides for an absolutely safe axle guide without sliding motion. The hinge connection I employ between the lever and frame preferably consists, in general, of a bearing member 7, which is bolted to the end of the frame 4 and projects into a slot 8 formed in the rear end of the lever 6. The sides of the slot are connected to said bearing by a bolt 9 passing through the overlapping parts near their lower edges as shown in Fig. 2.

The end 10 of the bearing and the opposing end wall 11 of the slot are inclined at different angles to said lower edges so as to permit a sufficient amount of swing to the lever and also to limit the movement of the same.

The pneumatic cylinder support comprises the frame 4 and a standard or post 12, which is perpendicular to the frame, is preferably formed integral with the bearing 7, and has fixed thereto a vertically arranged casing 13, the axis of said casing passes through or near the center of the lever 6.

To the interior of the air cylinder 13, near the upper edge thereof, is fixed a flexible diaphragm 14, the bottom of which, as shown in Fig. 2, rests on a freely movable plunger 15 whose stem or rod 16 projects through the lower open end of the cylinder 13 and terminates in a spherical end 17 seated in a socket 18 formed in the lever 6.

By making the casing a symmetrical geometric figure in section, I attain an equal distribution of the air pressure on all sides of the plunger so that the air, as before stated serves as a sufficient guide for the plunger and consequently all contacting sliding parts are omitted.

To provide for taking up the diaphragm as it is forced into a small diameter and taken from against the casing as the plunger moves into the latter, I so construct the casing and plunger that the diaphragm is automatically taken up by the air pressure as the plunger moves farther into the cylinder, the sectional area of the diaphragm increases below the plunger. Owing to the fact that the diaphragm is not taken up and laid onto a rigid surface, it does not get injured as heretofore in known existing devices, but owing to the form of the plunger and the structure of said diaphragm, the latter bellies under the plunger.

In the preferred form, shown in Fig. 5, the diaphragm 14 has a substantially semi-spherical bottom and is preferably made of tire material. To the inner wall of the diaphragm are fixed about twenty-four or more cords 14ª, which are about one-eighth of an inch thick and evenly distributed from the top to the bottom of the membrane. The membrane is thus divided into twenty-four sections, each of which takes part in the function of gathering up the fabric. When the piston travels upward and the membrane is turned inside the cylinder, which causes it to follow the smaller diameter of the piston, each of the twenty-four sections shrinks to a certain degree before forming a round shape. When a certain density of the sections, or the fabric of which the sections are composed, is achieved, the fabric cannot be further compressed and it snaps over and begins to form small channels or bellies. When the piston moves downward each of the twenty-four sections straightens out and expands sufficiently to assume the necessary diameter of the cylinder wall which prevents it from further expansion. The even division and small distance between the twenty-four cords does not allow the fabric to overlap itself and to close a plait under the influence of the air pressure, which would otherwise occur and damage the fabric in a very short time. When this form of diaphragm is used, the inner wall of the cylinder 13 is preferably smooth and the plunger head is made in the form of a disk.

To facilitate the taking up of the diaphragm, the interior wall of the cylinder 13 may be corrugated so as to form longitudinal channels or grooves 19 separated by ribs 20, as shown in Fig. 8.

To correspond with such a cylinder structure, the plunger head may be corrugated as shown in dotted lines Fig. 8, the convex portions 22 of the corrugations being opposite the ribs 20 of the cylinder so that the concave portions coöperate with the grooves or channels 19 of the cylinder to maintain the channels in the diaphragm and prevent them from flattening, as the lower end of the diaphragm is moved back and forth in the cylinder. In this structure the bellies are formed at the very beginning of the upward stroke of the plunger without the aid of shrinking or expanding of the material.

The bottom 24 of the diaphragm rests on and may be secured to the plunger head by a screw 25 (Fig. 2). The upper edges of the diaphragms are connected to the cylinder walls by rivets 27.

The diaphragms may be made of tire material, such as canvas impregnated with rubber, several plies of the material being cut into strips and vulcanized together at their longitudinal edges which overlap and form ribs 28, as indicated in Fig. 7. The rivets 27 are vulcanized in these ribs and secured to the cylinder at the ribs 20. The ribs 28 in the diaphragm also aid in preventing contact between the opposing faces of the diaphragm where the latter is first moved into the cylinder. The diaphragm may also be made of strips of leather connected together, along their longitudinal edges, by steel bands. These bands afford an efficient holding means for the rivets and also serve to prevent contact between the faces of the diaphragm as above described.

To render the diaphragm perfectly airtight, I provide a soft rubber lining 29 or its equivalent, which is secured to the casing by the cover of the latter. This lining not only serves to render the diaphragm airtight, but coöperates with the cover to seal the cylinder.

The cylinder has an inwardly projecting flange 30, formed on its upper end, which flange has recesses 30' at diametrically opposite points for the purposes of admitting the circular cylinder head 31, to be mounted in the cylinder beneath the flange 30 which latter forms an opening of less diameter that the diameter of the head. As shown in Fig. 5, the upper edge 29' of the lining 29, is slightly longer than the diaphragm and is turned over onto the top of the head 31 and is clamped between the latter and the underface of the flange 30. A bolt 32 passes through the head 31 and through a bridge piece 32ª by means of which the head is held firmly in place, said bridge piece having filling pieces 32ᵇ, which close the recesses 30'.

It will readily be seen that when compressed air is supplied to the cylinder in the usual way, the head will be pressed against the edge 29' of the lining 29 and bind the latter between the head and flange, thus insuring a perfectly tight joint which will prevent the escape of air from the cylinder and the entrance of dust and rain into the latter.

A modification of the sealing means above described is shown in Fig. 9 wherein the cylinder head 31ª has filling pieces 31ᵇ on its top for closing the recesses 30'. The soft rubber lining here consists of a bag 29ª having a nipple 29ᵇ detachably secured therein. This nipple projects through a central aperture 31ᶜ in the head and through an auxiliary cover 31ᵈ, seated on the end of the cylinder and secured in place by a nut 29ᶜ on the end of the nipple bearing on the cover. An air tube 33, through which air is supplied to the cylinder, is held seated in the nipple by means of a nut 29ᵈ engaging a flange 33ª formed on the tube.

From the foreging description of the construction of the parts, it will be understood that the plunger is guided in its movements solely by air in the cylinder pressing against the diaphragm.

The plunger rod 16 is preferably held in fixed relation to the plunger head by means of a flange 15' which is formed on the underside of the head, and snugly fits the upper end of the plunger rod, but said head and rod may be connected by a ball and socket joint 15'' as shown in Fig. 5.

To permit of an easy removal of the plunger rod 16 without exhausting the air from the cylinder, I make the rod so that it can be readily shortened by forming it of two telescoping members. When the rod is extended to its normal length, the lower end of the upper member rests on a horizontal pin 34 which projects through a slot in the lower member of rod. This key is held against longitudinal displacement by downwardly projecting lugs formed on the ends thereof. The upper member of the rod has a flange 35, formed on its lower edge, for the purpose of affording an abutment capable of being engaged by a lifting lever designed for such uses.

On automobiles having the three-quarter elliptic springs at the rear, the lower half elliptic spring sections 36, (one of which is shown in Fig. 1) are usually connected, at their rear ends, to the upper half sections by shackles, which hang below said lower sections. These latter sections are rockable on the rear axle 37, which is held against displacement longitudinally of the car by means of a torsion tube 38 which operates in a well known manner.

In applying my shock absorber to the rear of a car having the above described spring equipment, I connect as usual the front end of each lower half-elliptic spring sections 36 to the car frame 4, by means of a shackle 39, the rear end of each of said sections 36 is connected however, by a shackle 40, to the rear end of a lever 41 which I substitute for the usual upper quarter elliptical spring section. Each rear lever 41 is pivotally mounted near its front end in a bearing member 42, so as to form a two-armed lever and said bearing member is rigidly connected by suitable means to the rear of the car frame 4. This bearing member carries a pneumatic spring or shock absorber of the same construction as the one on the front of the car.

Owing to the fact that the car body, indicated at 43, usually projects over the rear springs and is in close proximity to the upper spring sections, I have modified the lever 41 to permit the cylinder 13 to be placed between said lever and the car body. Ae the space between the lever 41 and the lower end of the cylinder 13 is necessarily small and in order to have the rear plunger rod 16 of sufficient length so as to avoid an excess in the angular movements, I have provided the following described means for supporting the lower end of said rod.

The lever 41 is formed, at or near the middle of its rear arm with an opening 44 which is oval in forms, as shown in Fig. 3. The sides of said opening extend upward into the horizontal plane of the two ends of the lever and have bearings, formed in their upper edges, in which are journaled trunnions 45 formed in the sides of a socket member 46 at the upper end of the latter.

The socket member here shown consists of a cup having its walls converging toward its bottom in which is formed a semi-spherical seat 47 for the spherical end 48 of the plunger rod. This support not only permits the use of a rod of a length sufficient to minimize the angular movements thereof but it also permits of a universal movement of the rod. To limit the rocking movement of the rear lever 41 I interpose between the latter and the bearing member 42 suitable bumpers 42ª which may consist of sockets formed on the underside of said member at each side of the pivot point of the lever and adapted to hold soft rubber plugs that may be readily replaced when they become worn by contact with the lever.

To avoid compression in the rear cylinder, I may connect them by pipes 49, with an expansion tank 50 conveniently mounted at the rear of the car as shown in Fig. 1.

All lateral torsion and twisting of the steel spring section is taken up by the shackle connections between said sections and the pivoted plunger supports. This is of great importance as it will prevent binding of telescoping parts used in pneumatic springs of different structure. By this mechanism no matter what lateral deflection or twisting of the steel spring of the vehicle springs takes place, the shackles and the pivoted plunger supports will not be laterally deflected. They will be actuated in the same plane under all conditions of operation, thereby preventing the lateral displacement or inclination of the plungers while moving in the cylinders, and all frictional wear and binding between the plunger and the cylinder and also the running gear and the car frame is effectually prevented.

I claim—

1. In a pneumatic spring, a flexible diaphragm composed of connected divisions said diaphragm thickened along the lines of division thereby controlling the distribution of the folds of the diaphragm when in action.

2. In a pneumatic spring, a flexible diaphragm uniformly divided into section by means of a plurality of reinforcing members.

3. In a pneumatic spring, a flexible diaphragm uniformly divided into sections by means of a plurality of reinforcing members uniformly distributed from the top to the bottom of the diaphragm.

4. In a pneumatic spring, a flexible diaphragm divided into sections by a plurality of cords uniformly distributed and attached thereto from the top to the bottom of the diaphragm.

5. In a pneumatic spring, a diaphragm consisting of a membrane of textile material having a substantially semi-spherical bottom and divided into sections by a plurality of reinforcing cords uniformly distributed and attached to the membrane from its top to its bottom.

6. In a pneumatic spring, an air cylinder, an unguided plunger capable of universal movement therein, and a diaphragm between the cylinder and plunger, said plunger being yieldingly maintained axially of the cylinder under all conditions of operation solely by the air pressure in the cylinder acting on the diaphragm, a plunger rod connected to said plunger and means to support said rod.

7. In a pneumatic spring, an air cylinder, an unguided plunger therein, and a diaphragm between the cylinder and plunger uniformly divided into sections and arranged to fold over the edge of the plunger, said plunger being yieldingly maintained axially of the cylinder under all conditions of operation solely by the lateral air pressure in the cylinder acting on the diaphragm.

8. In a pneumatic spring, an air cylinder, a plunger capable of universal movement therein, and a diaphragm between the cylinder and plunger uniformly divided into section by means of a plurality of reinforcing members uniformly distributed from the top to the bottom of the diaphragm, for the purpose specified.

9. The combination with a vehicle frame, an air cylinder rigidly connected therewith, and a plunger in the cylinder, of a flexible diaphragm interposed between the cylinder and plunger adapted to solely and yieldingly guide the latter axially of the cylinder, a vehicle spring pivotally connected at one end to said frame, a yielding support connected to the frame and to the spring, and a plunger stem interposed between the plunger and support and pivotally connected with the support between the ends of the latter.

10. The combination with a vehicle frame, an air cylinder rigidly connected therewith, and a plunger in the cylinder, of a vehicle spring pivotally connected at one end to the frame, a lever pivotedly connected to the frame and to the vehicle spring, a socket member pivoted in said lever, and a plunger stem journaled in the socket.

11. The combination with a vehicle frame, an air cylinder rigidly connected therewith, and a plunger in the cylinder, of a vehicle spring pivotally connected at one end to the frame, a lever pivotedly connected to the frame and to the vehicle spring, a socket member journaled in said lever in the plane of the ends of the latter and extending below said ends, and a plunger stem resting on the bottom of said member and universally movable therein.

12. The combination with a vehicle frame, an air cylinder rigidly connected therewith, and a plunger in the cylinder, of a vehicle spring pivotally connected at one end to the frame, a lever pivotedly connected to the frame and to the vehicle spring, a cup pivotally mounted in the lever and adapted to swing longitudinally of the latter, and a plunger stem having a ball and socket connection in the cup.

13. A pneumatic spring comprising a cylinder having a corrugated interior wall, a plunger head having a plurality of projections radiating therefrom, a stem supporting the head, and a flexible diaphragm having longitudinal ribs formed therein connected to ribs on said interior wall, and resting on said projections.

14. In a pneumatic spring, an air cylinder having a removable head, a plunger movable in the cylinder free of the wall thereof, a flexible diaphragm resting on the plunger and connected at its upper end to the cylinder wall, and an inner air-tight lining resting on the diaphragm and having its upper edge connected to the cylinder head.

15. In a pneumatic spring, an air cylinder having a removable head, a plunger movable therein free of the cylinder walls, a flexible diaphragm connected at its lower end to the plunger and at its upper edge to the cylinder wall, and an inner air-tight lining resting on the diaphragm and having its upper edge clamped between the underside of an inwardly projecting flange formed on the upper end of the cylinder and the top of said removable head.

16. In a pneumatic spring, an air cylinder having an inwardly projecting flange at one end and a cylinder head of substantially the same diameter of the cylinder, said flange having recesses formed therein at diametrically opposite points for the insertion of the head into the cylinder.

17. In a pneumatic spring, an air cylinder having an inwardly projecting flange at one end, a cylinder head of substantially the same diameter of the cylinder, said flange having recesses formed therein at diametrically opposite points, and filling pieces for said recesses connected to the head.

18. A pneumatic spring comprising a cylinder, a plunger having a disk-shaped head, a substantially semi-spherical diaphragm above the plunger and having peripheral connection with the cylinder, said diaphragm having a plurality of ribs dividing it into sections, and an air tight closure for the cylinder.

19. In a pneumatic spring, a flexible diaphragm composed of narrow connected sections symmetrically arranged to control the folding of the diaphragm.

20. In a pneumatic spring, an air cylinder, an unguided plunger therein smaller than said cylinder, a flexible member inclosing an air cushion between said cylinder and plunger and bellying around said plunger, said plunger being yieldingly maintained axially of the cylinder, under all conditions of operation, solely by the air cushion, a plunger rod for said plunger and means to support the rod while permitting its movement in accordance with the movements of the plunger.

21. In a pneumatic spring, a cylinder, a plunger therein smaller than the cylinder, a flexible diaphragm composed of connected sections inclosing an air cushion between the cylinder and plunger and solely maintaining said plunger concentric with said cylinder, said sections controlling the folding of the diaphragm between the cylinder and plunger, and means to support said plunger while permitting its movement.

In testimony that I claim the foregoing as my invention, I have signed my name in presence of two subscribing witnesses.

JOSEF HOFMANN.

Witnesses:
J. W. ASHHURST,
H. C. JORDAN.